United States Patent [19]

Boranian et al.

[11] 3,924,023

[45] Dec. 2, 1975

[54] FLOOR TILE PRODUCTION AND PRODUCTS

[75] Inventors: Armen G. Boranian, Beacon; Bruce Terwilliger, Newburgh, both of N.Y.

[73] Assignee: GAF Corporation, New York, N.Y.

[22] Filed: Apr. 3, 1973

[21] Appl. No.: 347,439

[52] U.S. Cl. ............... 427/54; 264/132; 264/148; 264/153; 264/160; 427/293; 428/334; 428/425; 428/443; 428/489; 428/515; 428/520
[51] Int. Cl.² ............................................. B05D 3/06
[58] Field of Search . 117/8, 140 A, 140 R, 126 AB, 117/126 AQ, 11, 4, 15, 93.31, 45, 12, 138.8 UA; 161/256, 205, 23, 412, 410; 52/309, 389; 264/132, 148, 153, 160

[56] References Cited
UNITED STATES PATENTS

| | | | |
|---|---|---|---|
| 2,983,622 | 5/1961 | Biskup et al. | 117/45 X |
| 2,989,420 | 6/1961 | Zdanowski | 117/142 X |
| 3,442,730 | 5/1969 | Dietz | 117/126 AB |
| 3,485,732 | 12/1969 | D'Alelio | 204/159.15 |
| 3,509,008 | 4/1970 | Adomshick et al. | 161/205 X |
| 3,567,494 | 3/1971 | Fitko | 117/161 UC |
| 3,655,823 | 4/1972 | Parker et al. | 117/93.31 UX |
| 3,778,291 | 12/1973 | Elliott et al. | 117/12 X |

*Primary Examiner*—J. H. Newsome
*Attorney, Agent, or Firm*—Walter C. Kehm; Joshua J. Ward

[57] ABSTRACT

The vinyl asbestos and asphalt floor tiles are formed with a predetermined image printed on the surface thereof by rotogravure, planograph, letterpress or other printing techniques. Unlimited design possibilities not heretofore feasible by conventional valley printing of the continuous sheet of tile composition prior to cutting into individual tiles, are thus presented, the sheet being printed either during or after the sheet calendering operation. The continuous sheet, traveling at a rate of about 80–200 ft./min. is surfaced following said printing with a clear, durable wear layer having, upon curing, an advantageous combination of enhanced properties including enhanced resistance to scratching and abrasion, together desirably with improved resistance to staining, scorching and other desirable properties. The dimensional stability characteristics of the surfaced tiles are comparable to those of the untreated base tile, minimizing the problem of curling during storage, application and use. The clear wear layer is a cross-linked polymeric product of a fluid photo-polymerizable coating applied to the continuous sheet at a temperature of at least about 140°F and cured by exposure to ultraviolet light of sufficient intensity to initiate curing in less than about 15 seconds, typically with exposure times of from a fraction of a second to about 10 seconds. The thus-printed treated sheet is thereafter cut while warm to form individual tiles surfaced with said clear, durable, dimensionally stable wear layer having an advantageous combination of improved wear characteristics.

32 Claims, No Drawings

FLOOR TILE PRODUCTION AND PRODUCTS

BACKGROUND OF THE INVENTION

1. Field of the Invention

This invention relates to vinyl asbestos and asphalt floor tile. More particularly, it relates to a dimensionally stable tile having a printed surface covered with a clear, durable wear layer.

2. Description of the Prior Art

In the production of commercially desirable floor coverings, various thermoplastic films and curable coatings have previously been employed to enhance the appearance of the coverings and to resist staining, soiling from dirt, and the like. When employed on vinyl asbestos and asphalt floor tiles, however, such surface coatings have certain inherent deficiencies that render them unsuitable for general application. For example, thermoplastic wear layers lower the resistance of the tile to scorching from hot objects, such as burning cigarettes. In addition, the solvent resistance of such coated tiles is generally relatively poor. The tiles having such coatings of adequate techniques thereon are also found to have serious dimensional stability problems, manifesting themselves in the form of undesirable curling of the edges of the tile in storage or service. Such curling not only adversely affects the overall appearance of the floor, but also reduces the effectiveness of the covering in protecting the supporting base from exposure to liquids, dirt and undesirable contaminants of every description. In addition, such curling can, of course, create hazards to individuals walking on floors subject to such curling.

In an effort to overcome such disadvantages, the heating of surface coatings capable of curing by cross-linking was proposed. While a more durable coating can be achieved by such cross-linking, other difficulties are encountered, particularly with reference to vinyl asbestos tile. Curing cycles of ten to twenty minutes are normally required at temperatures on the order of 350°F. Vinyl asbestos tile, however, contains vinyl chloride that is degraded by exposure to such a high temperature bake cycle. In addition, the effectiveness of stabilizers employed to prevent both heat and light degradation in vinyl chloride compositions, either surface mottle or base stock, is depleted or adversely affected by the heat exposure of such curing. It is believed that such high temperature cure would necessitate the use of at least 20 percent additional stabilizer for heat stabilization alone. The heat would also decrease the effectiveness of the light stabilizers requiring perhaps a minimum of 50 percent additional stabilizer over and above the normal requirements of vinyl asbestos tile. In some instances, it may not be possible to achieve adequate light stabilization at prolonged exposure to such high curing temperatures. Under the high temperature conditions referred to above, the vinyl asbestos tile also becomes very limp and difficult to convey. In addition, appreciable post cooling facilities are, of course, necessitated by operation at such high curing temperatures.

Polymerizable coatings that require conventional organic solvents are also unsuited for the present application because the penetration of coating solvent into the vinyl asbestos base material tends to lower the resistance of the tile to indentation. Even after heat treatment, the tile contains a residual amount of solvent that adversely affects the flow and indentation properties of the finished tile in service.

Heat cured coatings have also been found to induce curling problems in vinyl asbestos tile caused, at least in part, by the shrinkage of the surface wear layer during polymerization. Such problems are complicated by any lack of uniformity of the coating applied. As the non-reactive solvent employed must be volatile, however, the application of a uniform film to the hot vinyl asbestos sheet is difficult to achieve on the production line because the rapid evolution of the solvent inhibits adequate leveling. Provisions must also be made to recover or dispose of the solvent effluent.

Heat-cured, cross-linked coatings, therefore, are generally unacceptable as wear layers for vinyl asbestos tile. One further disadvantage resides in the high speed commercial operations in which vinyl asbestos floor tile can be produced, the individual tiles being cut from a continuous sheet that travels from a calendering zone, through an embossing or valley printing zone if employed, to the cutting zone frequently at a rate of about 125 ft./min. or more. At such a rate of production, the baking cycle of from ten to twenty minutes at elevated temperatures and subsequent cooling would be totally impractical, requiring an unacceptable extension of the vinyl asbestos tile production line. For all of these reasons, vinyl asbestos floor tile is ordinarily made from vinyl asbestos sheets traveling at the indicated high rates of speed, with a wax finish applied to the surface to provide a temporary gloss and packaged anti-blocking properties.

Electron beam, gamma and x-ray treatment was also proposed to initiate curing and to promote cross-linking of surface coatings on vinyl asbestos floor tile. Such irradiation techniques are not acceptable except when applied at very low energy levels, as with a low energy electron beam curtain. Such a technique, however, requires shielding for the protection of operating personnel and is relatively expensive, as is the case with the other indicated irradiation techniques. High energy methods of free radical formation tend to discolor the base surface and promote extremely rapid polymerization. The resulting coating shrinkage appears to place the tile surface under tension such as to cause the undesired curling or cupping of the tile. This dimensional instability renders vinyl asbestos tile irradiated in this manner commercially unsuitable, as it prevents proper application and service of vinyl asbestos flooring surfaced in this manner.

Vinyl asbestos floor tile as usually prepared contains a polyvinyl chloride resin or a copolymer of polyvinyl chloride and polyvinyl acetate. The stabilizers are incorporated in an amount ranging from about 0.3% to about 1.5%, by weight of said base tile. The surface of the vinyl asbestos tile typically has a wax finish thereon as indicated above. While such tile is relatively free of the curling difficulties encountered in the various attempts to apply a clear wear layer to the tile, such tile must be cleaned and rewaxed at regular intervals to preserve its appearance in use, as is well known in household and commercial applications of such tile. Similarly, the surface of asphalt tile typically has a wax finish thereon, requiring frequent cleaning and rewaxing in use in order to preserve its appearance.

While such waxed vinyl asbestos and asphalt floor tile finds general acceptance in the field, any improvement facilitating the cleaning of such tile, and perhaps eliminating the need for waxing, would represent a significant advance in the field of floor tiles. There is, in addition, always a desire in the art to improve the wear characteristics and the appearance of floor tile. Such wear characteristics include resistance to both abrasion and scratching, particularly where the need for rewaxing is to be obviated. Other advantageous wear properties include staining and scuff resistance, resistance to scorching from hot objects, and the like.

With regard to appearance, the base vinyl asbestos or asphalt tile is commonly embossed and valley printed in order to enhance the decorative appearance of the tile. The design possibilities in multiple color variations or shadings achieved in the printing of paper or sheet flooring materials, however, are not possible in the valley printing of floor tile. By the very highly significant and advantageous discovery of the present invention, on the other hand, a revolutionary enhancement in the design and characteristics of such vinyl asbestos and asphalt floor tiles is achieved while, at the same time, enhancing the wear characteristics of such tiles so as to obviate the necessity for frequent rewaxing during the use of the tiles in conventional floor tile applications. The details of the invention are set forth below, the novel features thereof being particularly pointed out in the appended claims.

SUMMARY OF THE INVENTION

The highly advantageous floor tile of the present invention is a dimensionally stable vinyl asbestos or asphalt tile having a predetermined image printed on the exterior planar surface thereof and covered by a clear, durable wear layer having an advantageous combination of desirable wear characteristics. By means of rotogravure, letterpress, planographic or other known printing techniques, design and color flexibility heretofore not attainable by conventional embossing or valley printing techniques are achieved. The clear, smooth and durable wear layer, which enhances the appearance of the thus-printed tile, is an ultraviolet light-cured product of a fluid coating composition comprising one or more organic compounds each having two or more photo-polymerizable ethylenically unsaturated groups per molecule, typically together with a photo-sensitizer and a monomeric material capable of copolymerizing with said photo-polymerizable compounds. In the preparation of such tile, a warm vinyl asbestos or asphalt sheet traveling at about 80–200 ft./min. is printed, coated and exposed to ultraviolet light for a very brief period of exposure ranging from about 0.2 sec. to about 15 sec. The sheet then travels at the indicated rate of speed to a cutting zone for cutting into individual printed tiles, surfaced with a clear, durable wear layer and found to maintain the desirable dimensional stability and resistance to curling characteristics possessed by the untreated base tile.

DETAILED DESCRIPTION OF THE INVENTION

The overall process of the invention, as herein disclosed and claimed, enables vinyl asbestos and asphalt tile to be produced with predetermined, non-random printed images thereon, thus having the unlimited design flexibility heretofore possible in sheet flooring but not in floor tile products. This highly important and significant advance in the field of floor tiles is a result of the discovery that the vinyl asbestos or asphalt sheet, can be effectively printed and that a protective wear layer can be cured on the printed sheet in a manner entirely consistent and compatible with the requirements of conventional high speed floor tile production operations. This advantageous combination of factors thus permits the successful practice of the present invention, which represents a revolutionary approach to floor tile design and production.

Whereas the vinyl asbestos or asphalt sheet was heretofore deemed to be too porous and rough to permit the printing thereof with adequate and acceptable image quality and definition, the surface of the sheet is printed, as hereinafter disclosed in further detail, in the practice of the present invention to achieve acceptable image quality and definition without any essential departure from the conventional processing employed in the production of a continuous vinyl asbestos or asphalt sheet, and the subsequent formation of individual floor tiles therefrom. In addition to the general belief that the conventional sheet would be too porous, uneven and rough to even warrant consideration of the printing of the surface thereof, the absence of any suitable means for assuring the continued adhesion of the printed image to the exterior planar surface of the resulting floor tile, particularly when exposed to scratching, abrasion, staining, scorching or other forms of wear during ordinary floor tile service. The periodic cleaning and waxing commonly employed with respect to conventional floor tile products not only provide discontinuous and uncertain protection over the desired life of the tile, but might themselves tend to remove the printed image from said planar surface of the tile over an extended period of time.

For these reasons, therefore, floor tiles have heretofore been produced and employed in either plain, embossed or valley printed form. As will be appreciated by those skilled in the art, the term "valley printing" is a misnomer in that this technique does not actually represent the printing of ink on the planar surface of the continuous sheet in a desired image configuration, as in the printing of the present invention, but the filling of the valley portions of an embossed sheet with ink, typically to a depth of on the order of about ½ to about 2 mils. While such embossing or valley printing of the continuous sheet may be employed in various embodiments of the present invention, the novel printing herein provided resides in the application or printing of a predetermined, image on the outer or exterior planar surface of the sheet. When the sheet is also embossed, with or without valley printing, the printing of the planar surface of the sheet will, of course, constitute the printing generally of the non-embossed portions of the planar surface of the sheet. In valley printing by contrast, ink applied to the lands of a texture roll is impressed into the valley, non-planar or embossed portions of the surface of the sheet. While a portion of the ink may be absorbed into the sheet itself, the printed or image portions of said exterior planar surface of the sheet will have ink deposited thereon in the desired image configuration in contra-distinction to conventional valley printing whereon no such ink is deposited upon the exterior planar surface of the sheet.

By the application of a photo-polymerizable coating over the thus-printed sheet of the invention, as herein provided, the printed image on said planar surface is protected against undesired removal thereof and, at the same time, the wear characteristics and appearance of the resulting tile produced therefrom are enhanced, all without any significant adverse effect on the dimensional stability in resistance to curling of the thus-treated and surfaced tile vis-a-vis the desirable stability characteristics of conventional untreated tile. In addition, the virtually unlimited design possibilities inherent in such production of a printed tile represent a truly milestone advance in the art. Thus, the printing of tiles permits the use of a multiplicity of colors beyond the capability of valley printing techniques, and, significantly, permits the achieving of muted coloration and shading by the printing of one color over another in a manner well known in the conventional printing of substrates unrelated to the continuous vinyl asbestos or asphalt sheets employed in the practice of the present invention. By comparison, desirable design possibilities involving such coloration and shading effects, deemed unlimited in design potential and flexibility, can not be accomplished in any manner by the valley printing techniques presently applied in the production of vinyl asbestos and asphalt floor tile products.

The invention is hereinafter described with particular reference to vinyl asbestos floor tile operations, the analogy to asphalt tile operations being set forth in the latter portion of the specification. With respect to the commercial feasibility of applying a clear wear layer to printed floor tile, the dimensional stability problems previously encountered in the art must be avoided, and the overall printing-wear layer application and curing operation must be capable of ready incorporation in conventional high speed tile producing operations. The economic attractiveness of the operation would be seriously diminished by any efforts resulting in a necessary sacrifice of the essentially high speed character of existing floor tile production operations. The present invention, which offers outstanding improvements in the properties and design potential of vinyl asbestos and asphalt floor tiles, is readily applicable to conventional high speed operations.

In conventional operations, a mix of asbestos fiber, fillers, vinyl chloride copolymer, plasticizer, pigment and light and heat stabilizers are blended to a uniform mastic composition in a high intensity mixer at a temperature generally in the range of from about 280°F to about 320°F. The amount of stabilizer material employed is generally from about 0.3% to about 1.5% by weight of said mix.

The uniform mix is then consolidated, as in one embodiment by milling on a two-roll mill, to form a pad of said mix material. The thickness of this pad is generally from about ¾ inch to about 2 inches, although pads having a thickness outside this range can also be prepared and utilized. As some slight cooling will generally occur at this stage, the temperature of the pad will generally be on the order of from about 260°F to about 290°F.

The pad is then reduced in thickness to approximately from about 1/16 inch to about ⅛ inch upon passing through two sets of calender rolls. In the first set of rolls, the pad is reduced to about 1/6 inch at a temperature of from about 240°F to about 260°F. If desired, opaque and/or clear chip surface mottles are added to the pad between the first and second calender rolls. In the second set of calender rolls, the pad is further reduced to said 1/16 inch –⅛ inch range, being discharged from the calendering zone as a continuous sheet at a temperature of generally at least about 140°F, typically from about 160°F to about 180°F or above. The rate of discharge of the continuous sheet, in the commercial production of vinyl asbestos tile, is generally at least about 80 ft./min., typically about 125 ft./min. Considerably higher sheet travel rates, up to about 175 ft./min., or even to about 200 ft./min. or above, are also feasible in commercial operations, with, of course, correspondingly increased production of individual tiles. When the sheet is further processed by embossing or valley printing upon passage from the calendering zone, the sheet temperature following such embossing or valley printing will generally be from about 170°F to about 200°–220°F or above. It is within the scope of the present invention to print the sheet either before or after said embossing or valley printing, when employed, as well as intermediate said first and second calendering rolls as indicated above.

The vinyl asbestos sheet can be formed in the above manner, or by any other known technique, as by consolidating hot chips of similar composition.

While the vinyl asbestos sheet can be printed either intermediate the first and second calender rolls or following the calendering operation, it is generally advantageous and convenient to print the continuous sheet as it leaves the calendering zone at the indicated travel rate. It is within the scope of the present invention to employ any known printing technique for the desired printing of a predetermined ink image on the planar exterior or outer surface of the continuous sheet. Thus, the desired predetermined image may be preformed on a printing roll or plane or the ink particles may be passed through the open image areas of a stencil or screen for application to the continuous sheet in the desired image areas thereof, said stencil or screen being masked in the non-printing areas thereof as is well known in the screen or stencil printing art.

As is also well known in the printing art, the predetermined image of ink particles may be preformed on a printing plate or roll by one of several well established techniques. Intaglio or gravure printing, planographic printing also known as lithographic or offset printing, letterpress printing and xerographic printing are among the various types of printing applicable within the scope of the invention for the transfer of a preformed ink image to the planar surface of the continuous vinyl asbestos sheet as it leaves the calendering zone, with or without preliminary embossing or valley printing, or, alternately, as the sheet passes between the first and second calender rolls. It should also be noted that it is within the scope of the invention to preform the desired image on a printing roll or plate for transfer to an intermediate roll, e.g., an intermediate rubber roll which, in turn, contacts the continuous sheet for the transfer of the preformed image thereto.

As the various forms of commonly employed printing techniques referred to above are well known in the art, a detailed description of the various mechanical aspects of each is not deemed necessary herein, one of the novel features of the present invention being the application of such known printing techniques to the printing of the continuous sheet of floor tile composition traveling from the calendering zone prior to the application and curing of a wear layer coating thereon. It will suffice for present purposes, therefore, to merely indicate the general nature of each said printing technique. In intaglio or gravure printing, design cells consist of minute cells engraved below the surface of the printing plate or cylinder. Ink is wiped off the flat areas, but remains in the cells for transfer to the sheet or an intermediate printing roll by contact therewith. Rotogravure printing is commonly employed to facilitate the printing of a continuous sheet by the rotation of an engraved roll through a trough of ink, the wiping off of excess ink with a flexible steel blade and the contacting of the surface to which the image is to be transferred. In letterpress printing, on the other hand, the desired image configuration is raised above the background, with the transfer of ink in the preformed, predetermined image configuration from said raised portions of the surfaces contacted thereby. Flat or cylindrical printing surfaces can be employed.

Planographic printing, also known as lithographic or offset printing, uses a plane printing surface, the desired image design being neither raised nor depressed. The desired image and non-image areas of the printing plate or cylinder result from a difference in surface characteristics such that one is receptive to water and the other to ink. In practice, the plate or cylinder is commonly contacted initially with a moist roll to render the non-printing areas repellent to ink, which is thereafter applied by a succeeding inking roll to the desired image areas of the plate or cylinder. In xerography, which may employ powdered or liquid inks, a localized electric charge is applied to the desired image areas of the printing plate, the resulting electrostatic image serving to hold ink in the thus charged image areas for transfer to the substrate to be printed, i.e., in this instance the continuous sheet. It should also be noted that it is within the scope of the present invention to employ such printing processes for the printing of ink in the desired image configuration on a release web that is applied to the desired substrate or sheet, followed by the removal of the release web therefrom leaving the desired image printed on said substrate or sheet. Such decal transfer or decalcomania is known in the art with the formation of the desired ink image on the release web being conveniently formed by any of the various printing techniques disclosed above or other such known printing techniques.

The printing system employed in any particular embodiment of the invention will generally be the system readily available in the art that provides, on an over evaluation basis, a desired balance between the necessary capital and operating expenses and the degree of design flexibility desired for any given application. It is of significance to note, in this regard, that the known commercially available printing systems heretofore employed for other printing applications can readily be employed in the floor tile operations of the present invention, with such available systems having the capability of providing the highly advantageous, multiple color, decorative printing of the exterior planar surface of the continuous sheet as indicated above, with unlimited coloration and shading possibilities and the overlapping of colors to further enhance such unlimited coloration and shading potential in a manner not heretofore possible by the conventional valley printing technique.

In the printing of the exterior planar surface of the continuous sheet, it will be appreciated that a wide variety of ink formulations exist or can readily be devised for use in the practice of the invention. The unlimited coloration and shading effects obtainable by the use of a multiplicity of colors and the muting thereof by the printing of ink of one color over that of another color clearly suggest the scope of the variations in ink colors and formulations that may be employed in the practice of the invention. It will be understood, therefore, that the present invention is not limited in scope to any particular ink formulation that may be employed in the printing of the continuous sheet from which individual floor tile products are cut. It might generally be noted, however, that the inks employed in the practice of the invention include those of the type generally employed in the valley printing of such sheets, whereas the printing inks used in the offset printing of paper substrates are not generally desirable under the particular substrate-temperature conditions applicable in the practice of the invention as noted herein. In a representative plastisol ink formulation suitable for use in the present invention, about 27% by weight, based on the total formulation weight, of a relatively large $TiO_2$ white pigment is formulated with about 1% by weight of a barium-cadmium stabilizer, e.g., barium-cadmium laurate, with less than about 1% by weight of a suitable viscosity control agent, i.e., polyethylene glycol monooleate or mineral spirits, and a balance to make 100% by weight comprising resin and plasticizer having a weight ratio of from about 50:50 to about 60:40, respectively. The resin employed in such formulations is typically a vinyl chloride-vinyl acetate copolymer, e.g., comprising about 86% by weight polyvinyl chloride and about 14% by weight vinyl acetate. The resin is typically of the phthalate type, e.g., di-n-octyl phthalate. It will be readily appreciated by those skilled in the art that the relative proportion or concentration of pigment will vary depending on the nature of the particular pigment employed, the desired color effects, and the like, with the use of finger sized pigments, such as the commonly employed blue and green pigments, tending to reduce the amount of pigment considerably, as to about 1–2% by weight of the formulation.

In another ink formulation of a similar nature, the following proportions of major ingredients pertain, as expressed in percent by weight: 57% vinyl chloride copolymer dispersion resin, 38% phthalate type plasticizer, 2% stabilizers and 3% pigments. Such formulations will, of course, be subject to various modifications as is well known in the art. The vinyl chloride copolymer dispersion resin component may thus, in such instances, typically range from about 55 to about 65 parts by weight in formulations having from about 30 to about 45 parts by weight of said phthalate type plasticizer, from about 1 to about 3 parts by weight stabilizer and from about 1 to about 5 parts by weight of pigment. It will be appreciated that the invention is not to be construed as being limited in any manner by such illustrative examples of representative ink formulations deemed suitable for use in the sheet printing operations of the present invention.

The continuous sheet, printed as herein provided, and traveling at the indicated rate of speed, is coated with a fluid coating composition capable of curing upon exposure to ultraviolet light to form a clear, durable wear layer on the vinyl asbestos base. The coating will have a thickness generally of from about 0.001 inch to about 0.005 inch, preferably about 0.003 inch. For the purposes of the present invention, the composition of the coating will advantageously contain essentially no inert solvent, thereby avoiding the problems of solvent penetration into the base tile, as well as operational problems associated with solvent application and removal in the environment of a hot vinyl asbestos sheet. As previously indicated, a coating composition containing significant quantities of solvent such that solvent penetration into the vinyl asbestos sheet occurs, with a residual amount of solvent being extremely difficult to remove therefrom, lowers the resistance of the vinyl asbestos tile to indentation. It is within the scope of the invention, however, to incorporate a very small amount of a suitable diluent to thin the photo-polymerizable material to be coated on the vinyl asbestos sheet. Such small amounts, up to about 5% by weight of the coating composition, can be tolerated for this purpose providing curing takes place very shortly after application. As hereinafter indicated, however, the invention primarily contemplates the incorporation of a reactive vinyl monomer into the coating composition, said vinyl monomer serving to thin the photo-polymerizable material and being copolymerizable with said material and forming the durable cross-linked layer on the vinyl asbestos sheet without the disadvantages of solvent penetration into the base sheet. Nevertheless, a very small amount of diluent, e.g., methyl ethyl ketone, methyl isobutyl ketone, acetone or toluene, can be employed in addition to said vinyl monomers. The coating of the warm vinyl asbestos sheet following calendering and the printing of the exterior planar surface of the sheet, with or without embossing or valley printing, will generally take place at a sheet temperature of from about 110°F to about 210°-220°F or more. The sheet temperature will ordinarily exceed 130°F and will, in fact, generally be at least 170°F for embossed sheets, but generally lower if embossing is omitted. The coating composition can be applied to the surface of the warm vinyl asbestos sheet by any conventional coating means, such as by suitable roll, spray, curtain and extrusion coating equipment.

The printed vinyl asbestos sheet, having the coating composition applied thereon, travels at the indicated rate of from about 80 ft./min. to about 200 ft./min. immediately into an irradiation zone in which the coating is exposed to ultraviolet light having wavelengths within the range of from about 2500 A to about 4000 A. The temperature of the sheet at this stage will be approximately the same as, or slightly less than, the temperature in the coating stage, namely from about 120°F to about 180°F or above, such as to about 220°F or above. It should be noted that ultraviolet-initiated curing of coatings such as those employed in the present invention commonly results in an undesirable tacky surface when the irradiation is carried out in the presence of an atmosphere containing more than extremely low levels of oxygen. The oxygen, e.g., at more than about 300 ppm, readily reacts with free radicals, terminating further curing and preventing full development of the desired hardness. The irradiation of the coated vinyl asbestos sheet of the invention therefore, is commonly carried out in an inert, non-oxidizing atmosphere, e.g., a nitrogen gas atmosphere.

In accordance with the requirements of the high speed vinyl asbestos production operations into which the process of the present invention is incorporated, the ultraviolet radiation level to which the coating is exposed should be sufficient to initiate the desired curing of the coating within an exposure time period of about 15 seconds. With presently available commercial sources of ultraviolet radiation, exposure times within this limit are entirely feasible. In general, the radiation-sensitive coating can be cured upon exposure to ultraviolet light for periods of time ranging from as short as a fraction of a second, e.g., about 0.2 sec., up to about 10 seconds. It should be understood, however, that extending the irradiation zone in length or causing the continuous sheet to stop momentarily in the irradiation zone so as to extend the time of exposure somewhat beyond said 15 seconds is also within the scope of the invention, although not preferred, provided that such extension of the irradiation zone and/or momentary stoppage of the sheet is not destructive of the high speed character of vinyl asbestos tile production operations and does not unduly and unnecessarily increase the capital and operating costs of the irradiation zone. It will be understood, of course, that the number of irradiation units and the time of exposure should not be such that the energy of the irradiation applied to the coating will degrade the base sheet vinyl chloride or suffer the other disadvantages, e.g., curling of the base material, that has heretofore obviated against the use of a wear layer on vinyl asbestos tile.

It will be appreciated that a variety of commercially available ultraviolet radiation sources can be employed to supply the necessary ultraviolet radiation to cure the clear wear layer on the vinyl asbestos base material. Examples of suitable sources of ultraviolet energy include, but are not necessarily limited to, arc-jet plasmas of argon and nitrogen, carbon resonance lamps, high pressure mercury lamps and high pressure quartz tube units. The specific wavelenghts of light that are most effective will vary somewhat depending upon the particular coating composition employed in the practice of the invention, and the particular type and amount of photosensitizer incorporated in said coating. In general, however, the wavelengths between about 2500 and about 4000 angstroms are suitable for initiating the desired coating cure.

The intensity level of the energy output of the radiation source and the range of the light spectrum, both ultraviolet and visible, covered by the source are both subject to considerable variation from one particular commercially available source to another. Only a portion of the total light energy of most ultraviolet lamps is generally useful in the initiation of the cure of the fluid coatings applied to a vinyl asbestos sheet in the practice of the invention. For example, only about 8 percent of the spectrum from the argon plasma arc is believed effective. Nevertheless, exposure for only about two-tenths of a second to an argon plasma arc lamp that provides an intensity of 7.5 kilowatt per square foot is sufficient to completely cure a coating approximately 3 mils thick. On the other hand, about twenty percent of the spectrum of a high pressure mercury lamp is believed in the proper range for initiation of the coating cure. Exposure for about ten seconds to a 2.4 kilowatt per square foot mercury assembly will generally be adequate to achieve curing.

Commercially available ultraviolet light sources, therefore, are readily available for use in an irradiation zone compatible with the high speed requirements of vinyl asbestos tile production operations. Although, as indicated above, the irradiation exposure time should be within about 15 seconds and will generally be from about 0.2 sec. to about 10 seconds, it will be understood that particular exposure time limits will apply depending upon the particular capabilities of the irradiation source applied in a given application with respect to a particular coating composition. When employing plasma arc lamps of the curing capability indicated, for example, an exposure time of several seconds would be avoided in order to avoid baking the vinyl asbestos base composition to undesirably high temperatures at which degradation occurs or that, in any event, might require additional cooling or other disadvantages. With high pressure mercury lamps of the indicated capacity, on the other hand, an exposure time of less than a second, suitable for the plasma arc, would be insufficient to initiate the desired cure of most coatings. While the distance between the ultraviolet source and the coated sheet is not critical and will vary depending on the characteristics of the particular system employed, such distances may range from about 1 inch to about 12 inches or more, preferably from about 1 inch to about 3 inches for general convenience.

It is generally desired that the vinyl asbestos sheet pass immediately from the zone of the production line to the irradiation zone thereof in order to minimize any penetration of the coating composition into the base material. As indicated above, the coatings of the invention contain essentially 100% active ingredients and little or no inert solvent in order also to minimize solvent penetration into the base material being coated and residual solvent retention therein. In the high speed production operations employed in the practice of the invention, the continuous vinyl asbestos sheet will pass immediately from the coating zone to the irradiation zone essentially at the sheet travel rates indicated above.

While the ultraviolet radiation-initiated curing of the coating composition on the vinyl asbestos sheet is thus sufficiently fast to accommodate existing high speed vinyl asbestos tile production operations without adverse effect on the vinyl asbestos base composition, the resulting cure occurs at a sufficiently moderated rate so that the curling problems that heretofore have precluded the surfacing of vinyl asbestos tile with a clear wear layer are avoided. It is believed that contraction of the surface film occurs while the coating material is in an intermediate get state prior to full hardening. As a result, the contraction occurs without the transmission of stress to the vinyl asbestos base material. Complete hardening occurs after this surface shrinkage has been substantially completed, resulting in dimensionally stable vinyl asbestos tiles cut from the coated and ultraviolet radiation exposed vinyl asbestos sheet material.

Upon leaving the irradiation zone, the continuous sheet travels to a cutting zone at the indicated rate of from about 80 ft./min. to about 200 ft./min. or more. Coating and treating the entire vinyl asbestos sheet on the production line prior to die cutting the individual tiles is advantageous in that the edges of the resulting individual tiles are thus clean and square. Coating individual tiles, on the other hand, can result in slight edge beading of the coating that prevents close butting of the individual tile units when applied to a floor.

The coated sheet of vinyl asbestos material will be warm when it passes from the irradiation zone to the cutting zone on the production line. The sheet temperature should and ordinarily will be above about 120°F at the time of cutting. Preferably the cutting temperature should be at least about 130°F. As there is no necessity for applying heat to the sheet on the production line at this point, sheet temperature at the time of cutting will not exceed those existing as the sheet leaves the irradiation zone.

Upon cutting of the sheet, certain relaxation forces are believed to operate with respect to the individual tiles. If these forces operate over variable periods of time and under somewhat different temperature conditions, slight variations will often be noted in the dimensions of the individual tiles, rendering difficult their desired placement and appearance in flooring applications. Such dimensional variations are minimized by cutting the tiles while warm as in the practice of the invention. Size variations due to the indicated forces are thus found to occur at a much more uniform rate, so that the cooled and packaged individual tiles will have and retain a greater degree of size uniformity than is achieved when the tiles are cut from a cool sheet. In addition, it is believed that the shrinkage of the warm vinyl asbestos tile upon cooling tends to compensate for any volume reduction that takes place in the coating upon curing so as to further minimize the curling forces that can produce undesired dimensional stability and render the tiles unacceptable in subsequent storage and use. This is a further advantage of the overall process of the invention in which the coating, irradiation and cutting operations all occur with respect to the warm vinyl asbestos sheet on a high speed production line prior to the cooling of the individual tiles for subsequent packaging, storage and use.

In conventional sheet cutting operations, the portion of the sheet being cut is momentarily brought to rest in the cutting zone. In order to avoid any interruption in the essentially high speed travel of the continuous sheet at the indicated rates, a sheet loop of variable amplitude is provided in advance of the cutting zone in the manner well known in the art. As indicated above, it is within the scope of the invention, although not generally preferred, to provide momentary stoppage of the continuous sheet at other points, as in the irradiation zone, as by such sheet loops of variable amplitude. The continuous vinyl asbestos sheet nevertheless travels essentially at the indicated rate from the time it leaves the calendering zone until the time it is cut into individual tiles at the cutting zone.

The coating compositions employed for the clear wear layer are preferably water white, non-yellowing with age and extremely abrasion, mar and scratch resistant upon curing or exposure to ultraviolet radiation during high speed production of vinyl asbestos floor tiles. The clear wear layer also advantageously has superior resistance to scorching from hot objects and superior solvent, staining and soiling resistance as compared to ordinary vinyl asbestos tile. It will be appreciated that the floor tile of the present invention will not necessarily have enhanced properties, as compared with conventional tile, with respect to every feature upon which said tile is ordinarily evaluated. By terms such as "an advantageous combination of properties", as used herein, is meant that, on an overall basis, the floor tile of the invention will have properties that, in combination, are superior or highly advantageous as compared with conventional tile not having the subject wear layer thereon. The particular combination of properties obtained will, of course, vary depending upon a number of factors, including but not necessarily limited to the particular source of ultraviolet radiation employed, the time and degree of radiation, the temperature of the vinyl asbestos sheet, the nature of the photo-polymerizable compound or compounds employed, the nature and quantities of other ingredients, such as photoinitiators and monomers employed therewith, the particular distance employed between the radiation source and the moving sheet, and the like. In general, however, the tile of the present invention will have enhanced abrasion and scratch resistance characteristics as compared with conventional, untreated tile. The conventional tile is normally cleaned and waxed at frequent intervals during use, the factory waxing thereof serving primarily to prevent blocking of the tile while stacked in cartons during transport and storage. The tile of the present invention, among its advantageous features, obviates the necessity for such frequent waxing and significantly reduces or minimizes the efforts required in cleaning and otherwise maintaining the tile in service. In order to achieve these desirable results, the tile of the invention, having a clear, ultraviolet-cured wear layer on the surface thereof, will generally have improved abrasion and scratch resistance as compared with conventional tile that must be waxed and otherwise serviced to avoid undesired abrasion, scratching, scuffing and the like.

Abrasion resistance of tile is commonly determined by the mils of surface thickness lost per 1,000 cycles of a Tinius Olsen Wearometer, or by a similar test on this or another such conventional testing device. Under typical conditions, conventional vinyl asbestos tile will lose about 8 to 9 mils, e.g., about 8.6 mils, during the abrasion test. The ultraviolet-cured wear layer of the tile of the present invention, on the other hand, will generally lose less than about 5 mils, preferably no more than about 2–3 mils, under the same test conditions. Depending upon the particular operating conditions, the type of irradiation system employed, and the specific coating composition applied, abrasion losses of not more than about 0.8 mils or less can be achieved. It will be understood, however, that abrasion losses more nearly approximating those of untreated conventional tile may also pertain to particular embodiments of the tile of the invention, as where some other desirable combination of properties is desired for a given tile application. It will also be understood that the abrasion losses will vary also depending upon the specific conditions under which the testing device is operated. In general, however, the tile of the present invention, on a comparative test basis, vis-a-vis untreated conventional tile, will have enhanced abrasion resistance of, for example, on the order of about 1.5 to about 6 times less abrasion loss per given abrasion test cycles. It is also pointed out, however, that the abrasion test results can not be considered apart from the other properties of the tile surface. For example, a very hard tile surface, having perhaps an undesirably low resistance to scratching, may have a very high abrasion resistance but not be entirely suited for a given application upon an overall evaluation of the tile properties. Likewise, a very soft surface may cause bouncing of the abrasion test device so as to give an abnormally low abrasion loss, e.g., 20 or 30 times, or more, less than that of the untreated tile. Such a very soft surface, however, may tend to dull or discolor very rapidly, rendering such tile less than desirable for most applications. The correlation between abrasion test results and actual floor performance is also subject to various factors such as variations in the nature of the abrasion wear conditions encountered, environmental conditions and the like. It can be generally observed, nonetheless, that the tiles of the present invention will have enhanced abrasion resistance as compared with the untreated base tile composition.

The tile of the invention also generally has enhanced scratch resistance characteristics as compared with the untreated, conventional base tile. Scratch resistance is commonly measured on a Taber scratch testing machine, the required load applied to the arm of said machine in order to scratch the tile surface serving to measure the scratch resistance of the tile surface. While this test procedure is not an industry established standard, it provides a highly useful and convenient means for evaluating the scratch resistance of tile. Conventional, untreated vinyl asbestos tile of the type described herein is found to scratch at a machine loading of about 300–400 grams. Tiles made in accordance with the present invention and having a hard, clear, ultraviolet cured wear layer thereon, on the other hand, has been found to resist scratching up to loadings of about 900–1,000 grams. The tile of the present invention, therefore, commonly has a scratch resistance 2 or 3 times or more greater than that of the conventional tile as measured by the indicated test. For reasons generally as indicated above with respect to abrasion resistance, however, it will be understood that the floor tile falling within the scope of the present invention is not limited to such an improvement, although the tile of the invention will generally have enhanced scratch resistance as compared to the conventional, untreated vinyl asbestos tile.

In addition to the enhanced abrasion and scratch resistance of the tile of the present invention, the desirable overall combination of enhanced properties will advantageously include such features as improved resistance to scorching from hot objects, improved soiling or staining resistance, and the like, as well as enhanced appearance resulting from the presence of a hard, durable and clear wear layer on the conventional tile. It will be understood that various test procedures are employed in the art for measuring these properties, either with respect to general application or as related to specific tile service applications. Stain resistance, for example, is frequently determined by lipstick tests, brown oil tests and various other tests to determine or measure the chemically resistant character of the tile. As hereinabove indicated, it is not generally required that the tile of the invention enhance the characteristics of conventional tile with respect to all of such properties. Preferably, of course, all of the commonly observed properties will be enhanced by an optimum combination or interrelation between operating conditions pertaining, irradiation system employed, coating composition applied, and the like. In all embodiments of the invention, however, an advantageous combination of enhanced properties will be achieved as compared with the same combination of properties as achieved or applying with respect to the conventional, untreated tile.

A highly significant feature of the present invention is that the advantageous combination of enhanced properties is obtained without causing unacceptable curling as heretofore encountered in efforts to apply wear layers to vinyl asbestos tile. The dimensional stability characteristics associated with conventional vinyl asbestos tile are thus preserved in the surfaced tiles of the present invention. In order to determine the curling resistance of tile, conventional and well-established curling tests are applied in accordance with the applicable Federal specifications for floor tile that are commonly and generally observed with respect to commercial floor tile products in general. The curling resistance standards therein provided must generally be met as a necessary condition for the sale of a product as acceptable tile. It should be noted that the application of a wear layer as a feature of the process for producing the tile of the invention does not ordinarily assist in the meeting of the applicable curling standards, i.e., conventional tile having unacceptable curling will not ordinarily be converted to acceptable tile, from a curling viewpoint, by the process of the invention. Of significance from the point of view of the present invention, however, is the fact that the dimensional stability characteristics of the tile prepared in accordance with the invention are comparable to those of the untreated conventional tile, thereby providing the requisite resistance to curling during storage and use.

The indicated Federal specifications limit the allowable curl to 30 mils, 0.030 inch, for a 6 inch square tile. Under this standard, the corners of the tile, or any one of them, must not be raised up or curled more than said 30 mils with relation to the center of the tile. The tile surfaced as herein provided, utilizing a radiation source, a coating composition and overall operating conditions of a compatible nature appropriate to a given tile manufacturing operation, meets the specified curling standards in a manner comparable to the base, untreated, conventional tile while providing the advantageous combination of enhanced properties discussed hereinabove.

It is within the scope of the present invention to employ any of the known, commercially available coating compositions capable of curing upon exposure to ultraviolet radiation in the radiation zone specified to form the desired clear, durable wear layer. Well recognized modifications of such coatings, such as variations in the photo-sensitizer employed, or in the proportion and composition of the vinyl monomer employed to solvate the polymeric constituent for suitable application as a coating, or modifications to the polymeric material itself to enhance its sensitivity to curing upon exposure to ultraviolet light or the properties of the cured coating may also be made in the practice of the invention. The present invention, it should be noted, does not reside in composition and characteristics of any particular coating material per se, but in vinyl asbestos floor tile having a UV-cured wear layer thereon without loss of dimensional stability, regardless of what ultraviolet radiation-cured coating was employed in any given instance. While many polymeric compositions that are ultraviolet radiation sensitive are known in the art, however, it will be appreciated that not all of such compositions are suitable for use in the practice of the invention. Compositions that are degraded rather than cured upon ultraviolet radiation exposure are, of course, unsatisfactory. Likewise, compositions that are curable upon exposure to ultraviolet light, but that require exposure to such ultraviolet radiation for a longer period of time than that consistent with the indicated high speed vinyl asbestos tile production operations are also, of course, unsuited for use in the practice of the invention. Other coatings may also be unsuited for this application because an essentially clear wear layer is not formed upon ultraviolet radiation-induced curing. Particular coating compositions capable of forming a clear wear layer in the indicated manner may also be operable, but not preferred, if the properties of the cured coatings are not such as to represent a significant improvement in the overall combination of tile properties, such as the resistance of the vinyl asbestos tile product to abrasion, scratching, staining, scorching or the like. For example, a high gloss coating may be very durable and abrasion resistant, but may also be too brittle and, therefore, subject to scratching, frosting or crazing. For all of these reasons, therefore, it will be understood that not all untraviolet radiation-sensitive coatings will be suited for the purposes of this invention, in which the polymeric coating composition employed is such that, upon exposure to ultraviolet light, cures within the specified time limits, to form a clear, durable wear layer, enhancing the properties of the vinyl asbestos tile while preserving the dimensional stability of the vinyl asbestos base material.

As indicated above, the fluid coating composition employed will contain essentially 100% active ingredients and will comprise one or more organic compounds each having two or more photo-polymerizable ethylenically unsaturated groups per molecule, said compounds capable of curing upon exposure to ultraviolet light for the indicated period of time under the applicable operating conditions herein specified to form a clear, durable wear layer having an advantageous combination of enhanced wear properties without adverse effect on the curling characteristics of the tile as compared with said characteristics of the base, untreated conventional tile. Such unsaturated photo-polymerizable compounds may include materials having oligomeric structural units, or prepolymers therein, said units being free radical polymerizable upon exposure of the coating to ultraviolet light.

There are, of course, innumerable photo-polymerizable compounds and coating systems known in the art that have heretofore been cured by exposure to ultraviolet light, under circumstances, unrelated to the floor tile production operations of the present invention, following application to various substrates unrelated to said floor tile and the particular problems and requirements that have heretofore deterred any consideration of the use of such coatings in the floor tile field. The photo-polymerizable materials employed in the practice of the present invention will constitute those having, upon curing on the base material under the recited conditions, an advantageous combination of enhanced wear characteristics, dimensional stability and resistance to curling, and adequate adhesion to the base material with which it is employed. In this latter regard, the coating should have sufficient bite or penetration into the base material, perhaps for example a few microns, such that the cured wear layer of advantageous properties does not peal or crack off of the base tile during handling, storage, application or use. The present invention is not limited to, or does not reside in, particular coating compositions per se, and those skilled in the art will appreciate that the coatings employed in particular embodiments of the invention are subject to a wide variety of alternatives depending upon the particular operating conditions employed, the nature of the irradiation source, the particular vinyl asbestos base tile composition utilized and the particular advantageous combination of enhanced properties desired in any given embodiment. Quite obviously, not all materials generally characterized as being photo-polymerizable will have the overall combination of enhanced properties, together with the absence of undesired curling of the base tile, when employed under the conditions and restrictions necessarily involved in the production of floor tile as herein specified. In accordance with the teachings of the invention, however, those skilled in the art can readily and conveniently determine the particular commercially available or readily producible photo-polymerizable coating compound or combination thereof providing a desired combination of enhanced properties, without adverse effect on dimensional stability, for use with respect to the production of floor tile for a given application compatible with the particular technical, marketing and economic factors pertaining to a given application.

In general, the photo-polymerizable coating compounds employed will ordinarily include those of the types having chain hydrocarbon moieties separated by polar groups, terminated by two or more photo-polymerizable ethylenically unsaturated groups, advantageously of the acrylic or substituted acrylic type, most advantageously acrylyl groups of the general structure

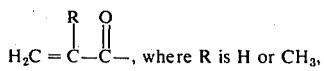, where R is H or CH₃, as hereinafter discussed with respect to the various types of said photo-polymerizable compounds of particular interest for possible application in the practice of the invention.

The combination of hydrocarbon moieties and polar groups generally found in such coatings provide for the desirable combination of features involved, namely sufficient adhesion to the tile base material, proper thermoplastic properties of the photo-polymerized coatings, e.g., indentation resistance comparable with that of the vinyl asbestos base tile, and the advantageous combination of enhanced properties discussed above, without adverse effect upon the dimensional stability and curling resistance of the base vinyl asbestos tile. The weight ratio of the hydrocarbon groups to the polar groups are generally adjusted to give the desired properties and compatibility with monofunctional monomeric material, if employed as hereinafter discussed. The advantageous combination of properties herein discussed, including hardness and durability, as measured by typical scratch and abrasion resistance tests, are generally achieved as a result of the characteristics of the particular polar groups employed in a given photo-polymerizable coating compound or mixture of compounds. The hydrocarbon groups, on the other hand, generally contribute properties to said compound or mixture thereof such as to render the coating compatible with the tile base material, assuring that the cured coating having an advantageous combination of enhanced properties will properly adhere to the base material and will not crack or peal off of the base material during subsequent production, storage, handling, application or use.

Coatings suitable for consideration for use in the practice of the invention will commonly be of the following general types, in terms of the types of polar groups contained therein: urethanes, ureas, amides, esters and epoxy-type groups, as well as various combinations thereof, although other types well known in the art may also be suitable, alone or in combination with the above. It is emphasized again, however, that the invention is not limited to the use of any particular photo-polymerizable compounds of the type indicated, those skilled in the art being readily able in a routine manner to evaluate the characteristics of any particular coating system in light of the desired combination of properties herein discussed as may pertain to the balance of requirements deemed desirable for any given application in accordance with the teachings of the present invention. One polar type of said multi-functional, generally di- or tri-functional, photo-polymerizable compounds suitable for consideration in particular embodiments of the invention are urethane-type compounds having two or more photo-polymerizable ethylenically unsaturated groups of the general structure

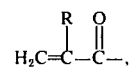

where R is either H or CH₃. Such urethane-type compounds have the general molecular configuration:

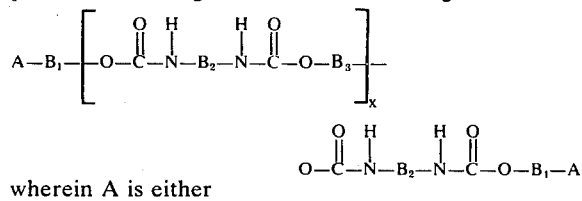

wherein A is either

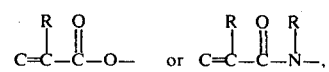

R being H or CH₃; x is 0, 1 or 2; and B₁, B₂ and B₃ are each taken from the group consisting of an alkylene of the type

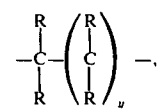

where R is H, CH₃ or C₂H₅ and y is either 0 or 1 to 6, cycloalkylene of the type

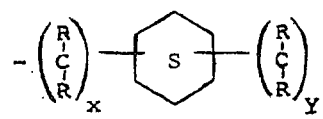

wherein R is H, CH₃ or C₂H₅, X=0 or 1 or 2 and y = 0 or 1 or 2, oxyalkylene of the type

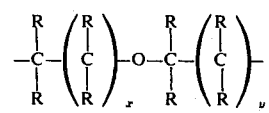

wherein R is H, CH₃ or C₂H₅, and x or y or both either 1, 2 or 3;

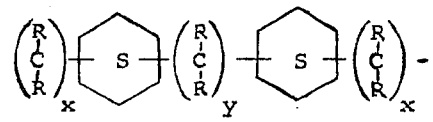

where R is H, CH₃ or C₂H₅, y is 0, 1, 2 or 3, and x is 0, 1 or 2; and

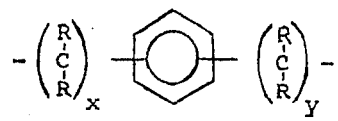

wherein R is H, CH₃ or C₂H₅, and x and y are both either 1 or 2. It will be appreciated that with respect to said urethane and said other type compounds, x and y may constitute a mixture of the values indicated herein.

Such coatings having urethane linkages therein may be prepared by convenient methods well known in the art. As the coating compositions per se are not the point of novelty of the present invention, details concerning the preparation of such coatings are not included herein, the preparation of such compounds generally being within the skill of the art. With regard to coatings of the type indicated above, however, it might be noted that one mole of dihydric alcohol may be reacted with two moles of disocyanate, followed by reaction of the product thereof with two moles of hydroxyethylacrylate. This well known operation is facilitated by the use of a basic catalyst, such as stannous octoate, dibutyl tin dilaurate or the like, in amounts of generally from about 0.05% to about 0.1% by weight of the total system, the operation being complete in a few hours at reaction temperatures of on the order of 50°C as is well known in the art. Illustrated examples of said photopolymerizable compounds of the type indicated are wherein A is either

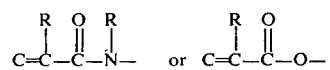

wherein R is H or $CH_3$, x is 0, 1 or 2, and $B_1$ and $B_2$ are as set forth above with respect to the equivalent hydrocarbon moieties of the urethane-type compounds. In the preparation of such compounds according to procedures well known and established in the art, one mole of diisocyanate may be added to two moles of the appropriate diamine compound, or a slight excess thereof, with the resulting amine terminated diurea structure thereafter being reacted with acrylic acid anhydride or acrylyl chloride. An illustrative example of a photo-polymerizable compound of the urea-type indicated above suitable for consideration in the production of an improved vinyl asbestos floor tile having an advantageous combination of enhanced wear proper-

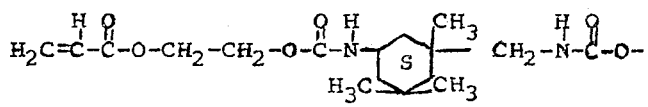

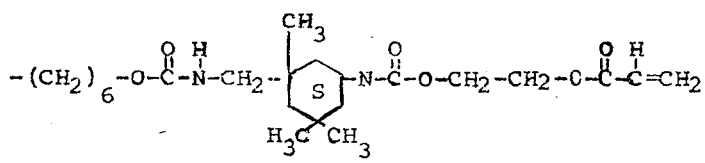

and

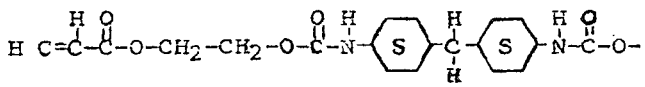

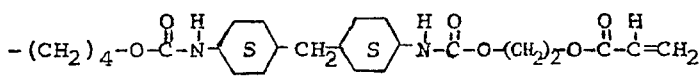

It will also be appreciated that compounds of a tri-functional photo-polymerizable nature can readily be produced and would be of interest with respect to the present invention.

Another type of polar linkage in the photo-polymerizable compounds generally suitable for consideration in conjunction with the process and product of the present invention are ureatype compounds likewise having two or more of said terminal photo-polymerizable ethylenically unsaturated groups. Such urea-type compounds have the general molecular configuration:

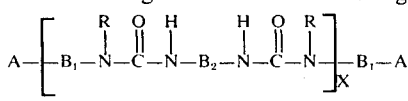

ties without undesired curl, as herein provided is the following:

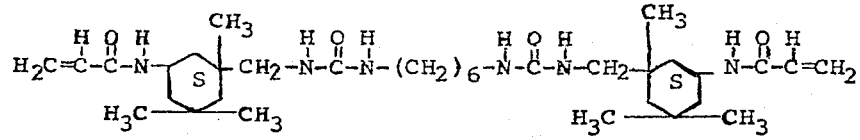

As will be appreciated by those skilled in the art, it would be obvious that tri-functional ethylenically unsaturated photopolymerizable compounds can be prepared by employing trifunctional reactants rather than the indicated di-functional reactants.

Other types of known compounds having two or more photopolymerizable ethylenically unsaturated groups per molecule and deemed advantageous for consideration in the providing of any particular combination of enhanced wear properties, without undesired dimensional instability and curling, under the particular circumstances of a given floor tile production operation, are amide-type compounds, such as those of the following types:

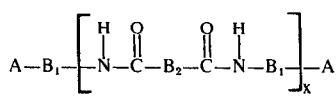

wherein A is

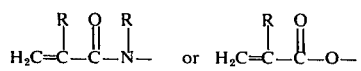

in which R is H or CH$_3$; $x$ is 0, 1 or 2; and B$_1$ and B$_2$ are as set forth above with respect to the equivalent hydrocarbon moieties with respect to said urethane-type compounds. In the preparation of such compounds, a dicarboxylic acid may be reacted with two moles of a diamine and the resulting product reacted with acrylic acid anhydride or acrylyl chloride as is well known in the art. An illustrative example of this type of compound that may be considered for use in the practice of embodiments of the invention is the following, it being appreciated that the coating employed in any given embodiment will be one giving an advantageous combination of enhanced properties, without adverse effect on the curling characteristics of the base tile, when cured within the conditions and limitations hereinabove set forth with respect to compatibility with conventional vinyl asbestos floor tile production. The following is an illustrative example of such an amide-type compound having two ethylenically unsaturated groups per molecule:

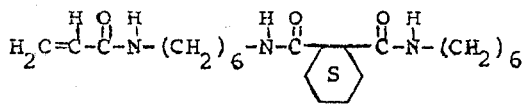

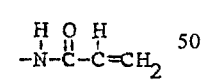

Other amide-type compounds may have the following general structural formula:

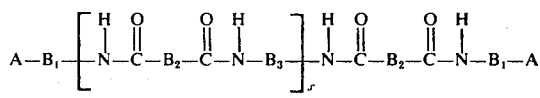

wherein A is

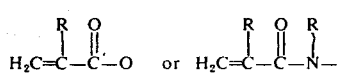

in which R is H or CH$_3$; $x$ is 0, 1 or 2; and B$_1$, B$_2$ and B$_3$ are each as provided above with respect to said B$_1$, B$_2$ and B$_3$ of the indicated urethane-type compounds, except that B$_3$ should not generally be a phenylene group. In general, amide-type compounds of this nature may be prepared, as is known in the art, by reacting two moles of a dicarboxylic acid and one mole of diamine, and reacting the resulting product with a suitable aminoalcohol compound to produce a hydroxy-terminated polyamide structure that can then be reacted with acrylic acid anhydride or acrylyl chloride. Illustrative of this type of compound is the following:

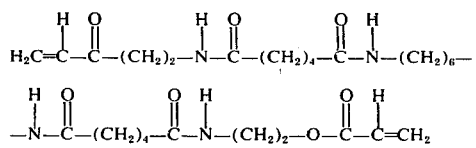

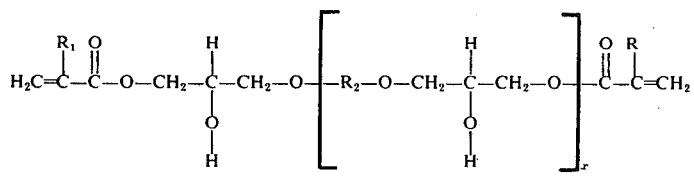

Similarly, compounds containing such ethylenically unsaturated groups together with hydrocarbon moieties and epoxy groups can be considered for use in the practice of the present invention. Such epoxy-type compounds have the general structural formula:

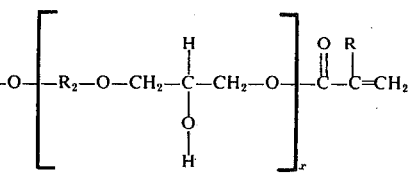

wherein $x$ is 1, 2 or 3; R$_1$ is H or CH$_3$; and R$_2$ is taken from the group consisting of

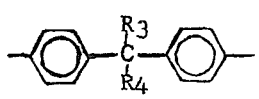

wherein R$_3$ and R$_4$ are each H or CH$_3$;

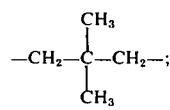

and cycloalkylene

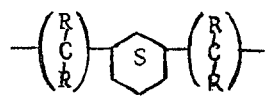

wherein R is H, CH$_3$ or C$_2$H$_5$. In general, diglycidyl ether may be reacted at both ends with said acrylic acid to produce the ethylenically unsaturated compounds of this epoxy-type of which the following is a specific illustrative example:

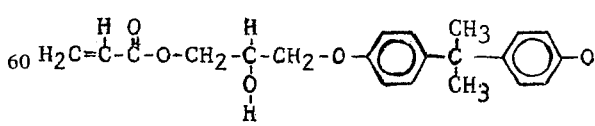

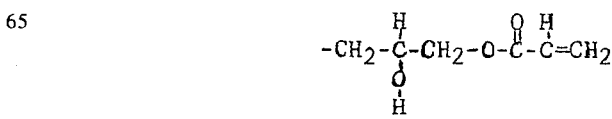

Organic compounds thus having two or more photo-polymerizable ethylenically unsaturated groups per molecule also include those having hydrocarbon moieties separated by ester groups. One of such ester-type group of compounds has the general molecular structure:

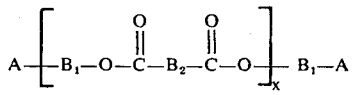

wherein A is

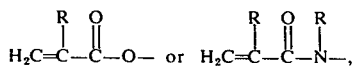

where R is H or $CH_3$; x is 1, 2 or 3; and $B_1$ and $B_2$ are taken from the group consisting of the groups recited above with respect to urethane compounds and

(cis and trans). Compounds of this type can be prepared by reacting dimethyl thalate with excess ethylene glycol, using an ester interchange catalyst such as tetraethyl titanate. Upon stripping of said excess under vacuum, substantially pure diethylglycol ester of terephthalic acid is obtained and reacted with acrylic acid anhydride or acrylyl chloride.

A representative ester compound of this type suitable for consideration in light of the requirements of the invention is as follows:

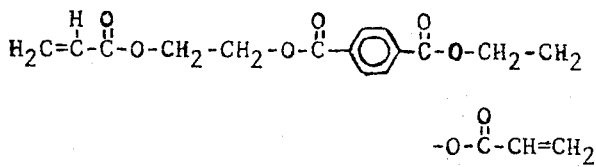

Similarly, such photo-polymerizable compounds having the following general molecular structure of the ester type may be considered for use in the practice of the invention:

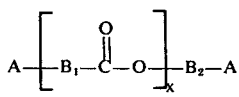

wherein A is

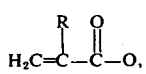

R being H or $CH_3$; x is 1, 2 or 3; and $B_1$ and $B_2$ are as set forth above with respect to urethane compounds.

A representative photo-polymerizable compound of this type suitable for consideration with respect to the present invention and the requirements for the production of the desirable wear characteristics upon cure within the very limited ultraviolet light exposure of the invention, while not imparting undesired dimensional instability to the base vinyl asbestos tile is as follows:

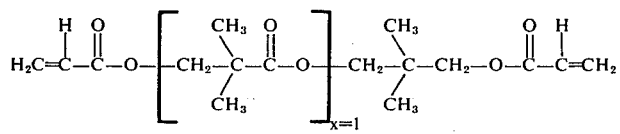

Such compounds may be generally produced by reacting a hydroxy carboxylic acid with dihydric material under esterification conditions. The terminal dihydroxy compound may then be reacted with said acrylic acid anhydride or acrylyl chloride. It should be emphasized, with respect to all of the compounds herein disclosed, that advantageous wear properties of the coated tile not accompanied by a resistance to curling and dimensional stability comparable with that of the base tile is not acceptable, as where the curling and stability characteristics are thus outside the generally accepted standards for commercial floor tile products.

Another ester type compound for consideration constitutes the terminally ethylenically unsaturated modification of the dihydric glycol diester of ω-hydroxy carboxylic acid as follows:

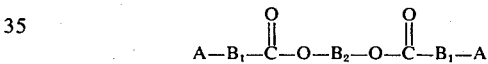

wherein A is again

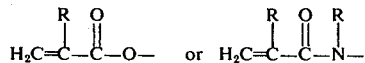

where R is H or $CH_3$ and $B_1$ and $B_2$.

Ultraviolet radiation curable acrylic-modified polyesters known in the art and suitable for consideration with respect to the particular operating conditions, and combination of advantageous properties desired, in the practice of the present invention broadly include those of the acrylic acid esters, the methacrylic acid esters, and the itaconic acid esters of aliphatic polyhydric alcohols, such as the di- and polyacrylates, the di-and polymethacrylates, and the di- and polyitaconates of ethylene glycol, triethylene glycol, tetraethylene glycol, tetramethylene glycol, trimethylolethane, and trimethylolpropane. Typical compounds of this type include prepolymers of trimethylolpropane triacrylate, trimethylolpropane, trimethacrylate, trimethylolethane triacrylate, trimethylolethane trimethacrylate, tetramethylene glycol dimethacrylate, ethylene glycol dimethacrylate, triethylene glycol dimethacrylate, tetraethylene glycol diacrylate, tetraethylene glycol dimethacrylate, and mixtures thereof.

Polyester and acrylic modified polyester materials containing side chains that favor high free radical efficiency are, as generally known in the art, most suitable for radiation-initiated polymerization reactions. Radiation-sensitive telomerized polyesters, selected to obtain the desired degree of hardness and abrasion resistance in the cured polyvinyl asbestos tile wear layer, together with the absence of adverse effect on the curling characteristics of the base tile, are thus useful in the practice of the invention. Such telomerized polyesters suitable for consideration include telomerized diacryl polyesters obtained from the condensation of a glycidyl ester with a saturated aliphatic polycarboxylic acid or a linear polyester of such an acid, as set forth in the D'Alelio patent, U.S. Pat. No. 3,485,732, and such telomerized diacryl polyesters from the condensation of a glycidyl ester with an unsaturated aliphatic polycarboxylic acid, or a linear polyester of such an acid, as described more fully in the D'Alelio patent, U.S. Pat. No. 3,485,733.

It will be appreciated that the examples herein presented of ethylenically unsaturated polymeric materials from which coatings curable to the requisite clearness and degree of hardness and durability can be selected are given for illustrative purposes only, with other polymeric coating constituents capable of forming the desired wear layer also being suitable. For example, unsaturated polyesters comprising the condensation products of $\alpha,\beta$-unsaturated dicarboxylic acids, such as maleic acid and fumaric acid, optionally in admixture with other di-carboxylic acids, such as adipic acid, phthalic acid and the like, and their anhydrides, with polyhydric alcohols, especially diols such as ethylene glycol, propylene glycol, polyethylene glycol, hexane-1,6-diol and the like can also be considered for use in the vinyl asbestos tile producing operations of this invention. Telomerized polyester oligomers can also be copolymerized with unsaturated alkyd resins, as is known in the art. For this purpose, a coating composition containing a solution or mixture of the unsaturated alkyd resin in the telomerized polyesters is first effected, with copolymerization of the components of the mixture occurring upon exposure to ultraviolet light in the irradiation zone. Examples of said unsaturated alkyd resins include ethylene glycol itaconate having a weight ratio of ethylene glycol to itaconic acid of 23/52. The components are mixed and slowly heated in the course of one hour from room temperature to 190°C, in an inert nitrogen atmosphere, and held at this temperature for three to five hours. Similarly, another suitable alkyd resin can be prepared by mixing 31 parts ethylene glycol and 32 parts maleic anhydride by weight and heating as above to 180°C, said temperature being held for four to six hours to produce ethylene glycol maleate.

It is also known in the art, as set forth in the Fitko patent, U.S. Pat. No. 3,567,494 that acrylic ester polymerizable by means of ultraviolet light can be prepared by the coesterification of a polyhydric alcohol having at least 3 esterifiable hydroxyl groups on adjacent carbon atoms with acrylic acid, and a dicarboxylic acid selected from a saturated aliphatic dicarboxylic acid and an alpha-unsaturated, alpha, beta-dicarboxylic acid, from 45% to 95% of the hydroxyl groups of the alcohol being esterified with the acrylic acid, 5% to 55% of the hydroxyl groups being esterified with the dicarboxylic acid. Such ultraviolet radiation curable esters are disclosed to be curable to a hard, clear, colorless film insoluble in methyl ethyl ketone solvent. Such ultraviolet radiation polymerizable esters include glycerine diacrylate maleate, glycering diacrylate succinate, glycerine diacrylate azelate, sorbitol tetraacrylate adipate, sorbitol tetraacrylate azelate, sorbitol tetraacrylate succinate and mannitol tetraacrylate azelate. Such polymerizable acrylic ester coating materials are obtained generally as a pale to colorless viscous liquid, a film of which is curable upon exposure to ultraviolet light for a period of 1 to 3 seconds or more with wavelengths in the range between 4,000 A and 2,000 A at an irradiation intensity of about 2 to 10 watts/cm² of film surface with medium pressure mercury vapor discharge tubes in quartz.

In accordance with customary practice, the coating compositions applied to the vinyl asbestos sheet will advantageously contain a conventional amount of known photo-sensitizers. Such photo-sensitizers or photoinitiators absorb ultraviolet light resulting in the formation of free radicals capable of initiating polymerization. Illustrative of such photo-sensitizers are sulfur-containing compounds, such as dithiocarbamates, trithiocarbonates, thiuram compounds, thiazoles and xanthates, as well as aromatic disulphides, $\alpha$-phenylacetophenone derivatives, e.g., benzil and benzoin, and benzoin ethers, such as benzoin-methyl, -ethyl, -n-propyl and -isopropyl ethers. Such photo-sensitizers are generally employed in amounts from about 0.5% to about 5%, commonly from about 1% to about 2% by weight of the coating composition. The amount and type of photo-sensitizers, free radical generating under ultraviolet radiation, employed in the practice of the invention will be selected, of course, to be compatible with the particular polymeric system utilized. It will also be appreciated that the particular photo-sensitizers employed in any given application must also be sensitive to the wavelengths and energy level of the ultraviolet light source with which it is employed in the given application in order to initiate the desired reaction and thus effect the curing of the coating on the vinyl asbestos sheet.

The coating composition will also usually contain a mono-functional vinyl monomer copolymerizable under ultraviolet radiation with the above-indicated multi-functional, photo-polymerizable ethylenically unsaturated compounds used in the coating composition. The monomer functions to reduce the viscosity of the di- or tri-functional organic compound that may otherwise be too viscous to apply to the continuous sheet of vinyl asbestos material passing the coating zone of the production line. The monomers are preferably of a suitably low vapor pressure to prevent evaporative loss during application and curing. The monomers must also be sufficiently stable to prevent premature gelation or reaction with the photo-polymerizable, ethylenically unsaturated di- and tri-functional organic compounds employed in the coating composition prior to exposure of the coating to ultraviolet light in the irradiation zone of the vinyl asbestos tile producing operations of the invention. Illustrative of the numerous mono-functional monomers that are suitable for use in the invention are acrylates or methacrylates having the formula

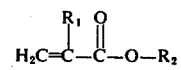

wherein $R_1$ is H or $CH_3$ and $R_2$ is an alkyl or cycloalkyl group having 6 to 18 carbon atoms, a phenoxyalkyl group of 6 to 18 carbon atoms, or a hydroxyalkyl group. In this regard, it will be appreciated that certain limited amounts of hydrophilic monomers, such as hydroethyl acrylate or N-vinyl pyrrolidone, may be present in the overall coating composition without adversely affecting the properties of the cured wear layer coating so long as the amount is not such as to introduce undesired water sensitivity to the coating. Other representative examples of the numerous mono-functional monomers of the type indicated that are suitable for use in the invention are lauryl methacrylate, isodecyl acrylate, 2-ethylhexyl acrylate, cyclohexyl acrylate and 2-phenoxyethyl acrylate. Styrene may be employed, but is generally not preferred because of a potential to discolor upon long time exposure to light in service. Small amounts of styrene or vinyl toluene can be tolerated, however, as can small amounts, generally from about 1–2% up to about 5% by weight, of monomeric materials other than said mono-functional material, e.g., trimethylolpropane triacrylate.

The amount of monomer employed for the indicated purpose will vary depending on the characteristics of the di- or tri-functional organic compound of the coating. While the monomer content will generally range from about 15% up to about 45% by weight, or higher in some instances up to about 60% by weight, based on the total weight of the ethylenically unsaturated di- or tri-functional material and said monomer, the monomer content will often be from about 30% to about 35% by weight, although smaller amounts can be used where sufficient for viscosity reduction.

In the practice of the invention, a typical vinyl asbestos composition may consist of the following:

|  | Wt. % |
| --- | --- |
| Asbestos fiber | 18 % |
| Vinyl chloride copolymer (e.g., 86% polyvinyl chloride) (     14% vinyl acetate) | 17 % |
| Butyl benzyl phthalate plasticizer (BBP) | 5.5 % |
| 200 mesh limestone | 55 % |
| TiO$_2$ pigment | 3 % |
| Stabilizers | 1.5 % |
| 1% barium cadmium laurate |  |
| 0.5% epoxidized soybean oil |  |

The mix may be processed in a Banbury unit until fluxed to a uniform mastic composition at about 290°F. This material may then be processed on a two-roll mill from which it is removed as a pad approximately 1 inch thick. This pad can then be reduced in thickness to approximately 1/16–½ inch by passing it through one or more sets of calendering rolls. If desired, the resulting continuous vinyl asbestos sheet may be embossed or valley printed with a texture roll while still hot. The temperature of the continuous sheet may be about 185°F at this point, the sheet traveling at speeds of from about 80 ft./min. to about 200 ft./min. or more as indicated above. A predetermined image is thereupon printed on the continuous sheet as said sheet passes a printing zone for contact therein with a cylindrical printing roll having ink deposited thereon in the desired image configuration. The ink employed is a formulation of about 3% green pigment, 2% barium cadmium laurate stabilizer, 38% di-n-octyl phthalate and 57% vinyl chloride-vinyl acetate copolymer. The ink is thereupon transferred to and printed on the exterior planar surface of the sheet in the desired image configuration.

As the sheet then passes through a coating zone, a clear coating composition, capable of curing upon exposure to ultraviolet light, can be applied as by spraying to a thickness of 0.003 inch. In one embodiment, the coating applied may be a glycerine diacrylate maleate prepared as set forth in the example of the Fitko patent, U.S. Pat. No. 3,567,494, employing 97 parts by weight of 95% glycerine, 144 parts of glacial acrylic acid, 39.2 parts of maleic anhydride, 4.2 parts of p-toluenesulfonic acid and 4.3 parts of hydroquinone in toluene. The continuous sheet is then passed immediately at the indicated travel speeds to an irradiation zone in which a nitrogen atmosphere is maintained. High pressure mercury lamps providing a total of about 1,200–1,500 watts per linear inch of ultraviolet radiation across the entire coated surface of the sheet. Upon leaving the irradiation zone after approximately 10 seconds, the sheet cooled to about 130°F passes to the cutting zone where it is cut into individual tiles.

The thus-treated vinyl asbestos tile products will advantageously exhibit far superior resistance to solvent attack, staining, soiling and heat scorching than the same vinyl asbestos tile base composition without the clear wear layer thereon. The gloss of the surfaced tile will be higher, and it will have a smoother, more attractive surface. The abrasion resistance of the cured composition may be two or 2½ or more times greater than that of the equal thickness of the uncoated vinyl asbestos tile. The scratch resistance of the coated tile of the invention will likewise be considerably enhanced over that of the untreated conventional base vinyl asbestos tile. The superior abrasion and scratch resistance characteristics achieved are particularly advantageous and desirable since, unlike the conventional base vinyl asbestos tile, the tile of the invention is not generally waxed to achieve such resistance to abrasion and scratching. The advantageous combination of enhanced properties includes such superior abrasion and scratch resistance, as compared with the untreated base tile, in addition, in preferred embodiments, to the other desirable features indicated in the clear, durable, ultraviolet cured wear layer of the invention. Even when subjected to accelerated curl testing conditions, however, the product will exhibit the desired dimensional stability that the untreated tile possesses. In this regard, it is particularly pointed out that the product of the invention thus constitutes an improvement related to conventional vinyl asbestos tile, not to a new tile product necessarily involving a new base composition compatible with any particular ultraviolet curable coating composition. The conventional vinyl asbestos tile provides the desired dimensionally stable base deemed highly important in the production of a commercially suitable floor tile product. Various rubber or plastic substrates can not simply be substituted for the vinyl asbestos base, therefore, to form a floor tile by the incorporation and curing of a photo-polymerizable wear layer coating thereon. Such a product would not be the equivalent of the product of the present invention, which relates not to the formation of a new floor tile material, but to a highly desirable improvement enhancing the wear characteristics of conventional, commercially established and desired, vinyl asbestos floor tile. The dimensionally stable vinyl asbestos base is, in other words, an integral feature of the present invention, the coatings having two or more photo-polymerizable ethylenically unsaturated groups per molecule being those that provide an advantageous comination of enhanced properties without undesired diminution of the dimensional stability and curling resistance of the base vinyl asbestos tile.

As was indicated above, the irradiation time will vary depending on the particular source of ultraviolet energy employed. For an arc-jet plasma type source, the irradiation exposure time required may be only a fraction of a second. In addition, a variety of other modifications can be made in various aspects of the invention. For example, flattening agents that do not reduce transparency can be added in relatively small quantities to lower the sheen to the desired level, the coatings normally exhibiting a high gloss. Fine particle size silica is effective for this purpose.

In another embodiment, the novel process of the invention may be carried out as above, with the specified continuous vinyl asbestos sheet traveling at a speed of about 150 ft./min. from the calendering zone through the printing zone, wherein the exterior planar surface thereof is printed by the transfer of ink from a letterpress roll, to a coating zone in which a radiation sensitive coating is applied prior to passage to an irradiation zone wherein the coating is exposed to ultraviolet light in an essentially non-oxidizing atmosphere for a period of about 0.2 seconds employing an argon plasma arc lamp. In this embodiment, a glycerine diacrylate maleate prepared as indicated above is blended with vinyl monomer and photoinitiator to produce the coating composition. For this purpose, 15% by weight n-hexyl methacrylate monomer and 3% by weight benzoin-isopropyl ether photoinitiator are employed, based on the total weight of the coating composition. The coating is applied in a thickness of 0.003 inch. In the irradiation zone, the argon plasma is positioned at a distance of 3 inches from the vinyl asbestos sheet. Upon exposure to ultraviolet light for the indicated period of time, the vinyl asbestos sheet passes to the cutting zone at 150 ft./min. The vinyl asbestos sheet is cut, at the cutting zone, into individual dimensionally stable, printed tiles having a clear, durable cross-linked wear layer thereon. Other organic compounds, such as those of the various types hereinabove set forth, may also be employed in coating compositions having typically a monofunctional vinyl monomer copolymerizable therewith, also incorporated therein, together with a suitable photoinitiator. For the reasons disclosed, the particular coating composition employed in any given application will be one providing a particularly desired advantageous combination of enhanced properties under particular irradiation conditions, without an adverse effect upon the dimensional stability and resistance to curling possessed by the base vinyl asbestos tile.

The stabilizers employed to prevent both heat and light degradation of vinyl chloride polymer vary depending on pigmentation and whether the material is surface mottle or the base stock. Barium-cadmium laurates and octoates, bariumcadmium-zinc laurates and octoates and barium-cadmium phosphates are stabilizers commonly employed in amounts of from about 0.2% to about 1.0% by weight of the base composition. These stabilizers inhibit heat degradation and are important to light stabilization. Such stabilizers are used in conjunction with epoxidized soybean oil or epoxy resins and dicyandiamide with a total stabilizer content of from about 1.5% by weight of the tile base composition. It should be noted that the present invention is operable with conventional amounts of such stabilizers. The amount employed in any given application will be dependent upon the particular tile composition employed, the effectiveness of the particular stabilizers employed, and the like. The practice of the present invention, in other words, is not such as to require the incorporation of stabilizers in the tile composition over and above the amount that would otherwise be used in conventional vinyl asbestos tile producing operations. It should also be noted that the vinyl asbestos base composition may contain a blend of pigments rather than $TiO_2$ alone as indicated above. For this purpose, carbon black, yellow iron oxide and red iron oxide may be used with $TiO_2$ in desired proportions in the pigment portions of the vinyl asbestos base composition.

In a further illustrative embodiment of the invention, the specified vinyl asbestos sheet at about 180°F travels at about 125 ft./min. form the calendering zone to the printing zone wherein a multicolored rotogravure printing plate imparts a desired predetermined, non-random printed image to said sheet. The printed image is of ink formulations comprising about 2–4% by weight of various colored pigments, about 2% barium-cadmium laurate stabilizer, about 40% by weight di-octyl phthalate with the balance to make 100% by weight comprising vinyl chloride-vinyl acetate copolymer. From the printing plate, the continuously moving sheet travels at the indicated rate to the coating zone for the application therein of about 0.002 inch of a coating having a formulation of about 76 parts by weight of a urethanoethyl acrylate having the formula:

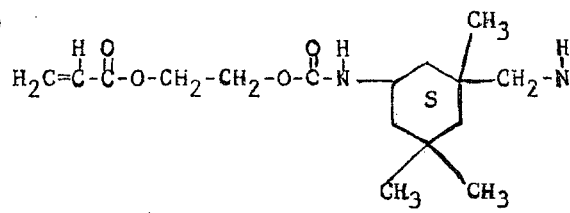

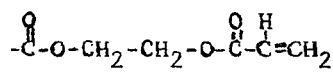

about 19 parts by weight 2-ethylhexyl acrylate, about 5 parts by weight 2-hydroxyethyl acrylate and about 1 part by weight benzoin methyl ether. The thus-coated sheet passes immediately to an irradiation zone wherein the coating is exposed to the ultraviolet light of an argon plasma arc in an essentially nonoxidizing atmosphere for a period of about 0.4 seconds. The sheet then passes to the cutting zone where it is cut into individual dimensionally stable tiles having a clear, durable wear layer thereon. The scratch resistance of the wear layer is excellent, both said scratch resistance and the abrasion resistance being at least twice that of the base vinyl asbestos tile. The coated tile, having a base vinyl asbestos thickness of about 3/32 inch, is dimenstionally stable and has a resistance to curling that is comparable to that of said base tile. The application of the ultraviolet-cured wear layer thus does not adversely affect the curling resistance for 6 inch × 6 inch and 12 inch × 12 inch tiles such as to render the tile unacceptable for floor tile application under applicable standards and specifications applied in the floor tile industry.

The present invention, therefore, represents a highly significant advance in the field of vinyl asbestos tile. It should also be noted that the appearance and properties of asphalt tile can be enhanced by the printing of the exterior planar surface of the continuous asphalt sheet and the subsequent application of a clear, durable wear layer thereon in essentially the same manner as set forth above with respect to vinyl asbestos tile production. Asphalt tile, as known in the art, is manufactured by the use of a binder composed of various known combinations of asphaltic materials such as Gilsonite and blown asphalt, olefin-derived hydrocarbon resins, coumarone-indene resins, polystyrene and plasticizers such as limed tall-oil or mineral oil. The binder materials are combined with limestone filler, asbestos, antioxidant and coolants in a suitable mixer, such as a Banbury, at a temperature of from about 225°F to about 250°F. A typical asphalt tile formula comprises 23.5% binder materials, 23.0% asbestos, 50.0% filler, 0.5% antioxidant and 3.0% pigment by weight. The resulting plastic mass is consolidated by milling to form a pad that is processed through a calendering operation as heretofore described with reference to vinyl asbestos tile. The asphalt tile material is discharged at a travel rate of from about 80 ft./min. to about 200 ft./min. or more, from the calendering zone as a continuous sheet at a temperature of generally about 130°F to about 170°F, with a thickness generally of about 3/32 inch –18 inches The asphalt sheet may be embossed or valley printed, if desired, either before or after the printing of the exterior planar surface of the sheet as provided in accordance with the invention. The printed sheet is coated with a fluid coating composition capable of curing upon exposure to ultraviolet light to form a clear, durable wear layer on the asphalt base. The nature of the cooling composition, its thickness and manner of application can all be essentially the same as that set forth above with respect to vinyl asbestos tile. Similarly, the coated sheet is passed at the indicated rate to an irradiation zone in which it is exposed to ultraviolet light having wavelengths within the range of from about 2,500 A to about 4,000 A in an essentially non-oxidizing atmosphere at a temperature generally of from about 120°F to about 170°F for a non-embossed sheet, or up to about 180°F or more, e.g., up to about 220°F, when the sheet is embossed or valley printed in addition to being printed on the planar surface thereof. The intensity level of the ultraviolet radiation is sufficient to initiate the curing of the coating within an exposure time of from about 0.2 sec. to about 15 sec. employing any convenient radiation source, such as high pressure mercury lamps, arc jet plasmas of argon and nitrogen and the other sources mentioned above. Upon leaving the irradiation zone, the warm asphalt sheet is passed to the cutting zone wherein the sheet is cut into individual tiles. The properties of the thus-surfaced asphalt tile are significantly superior to those of conventional asphalt tile. Whereas asphalt tile has a relatively low resistance to many solvents, grease, household cleaners and the like, the tile surfaced as herein provided has superior resistance to solvents, e.g., 95% ethyl alcohol, kerosens, etc., grease resistance, and superior abrasion, nar, scratch, indentation, soiling and staining resistance, together with enhanced appearance. The surfaced asphalt tile have these desirable properties furthermore, as a dimensional stability and resistance to curling comparable to that of conventional asphalt tile. As with the vinyl asbestos tile discussed above, the advantageous combination of enhanced properties of the asphalt tile of the invention will generally include a combination of superior abrasion and scratch resistance, normally at least doubled, as compared with conventional base asphalt tile, which must be frequently cleaned and waxed to assure against undesired scratching and abrasion. The unlimited design potential and flexibility referred to above with respect to vinyl asbestos tile printed on the exterior planar surface thereof applies equally to the printed asphalt tile of the invention.

The printing and coating of the continuous sheets from which vinyl asbestos and asphalt floor tiles are prepared as herein provided enhances the design potential and appearance of the tiles and provides a durable wear layer thereon without sacrifice of the dimensional stability characteristics conventionally associated with vinyl asbestos and asphalt floor tile products. Significantly, these highly desirable features are achieved by means entirely compatible with existing high-speed tile producing operations. It will be understood that various changes and modifications can be made in the details of the invention without departing from the scope of the invention as hereinafter set forth in the appended claims. The printing inks employed, for example, may include relatively less expensive ink formulations or, alternately, more expensive, specially formulated blends to enhance the adhesion to the particular sheet composition employed under the applicable operating conditions of any particular embodiment of the invention. It will also be recognized that the continuous sheet printed as hereinabove provided can also be coated by other techniques so as to provide a clear, durable wear layer serving to protect the ink image printed on the exterior planar surface of the tiles made from such a printed sheet. It will also be appreciated that some of such techniques may be compatible with the requirements of high-speed floor tile production operations, while others may require some modification thereof, possibly involving reduced speed operations, extended production lines for the treatment of the continuous sheet or off-line operations, as in the treatment of the continuous sheet at temperatures lower than those pertaining to the warm sheet traveling from the calendering zone to the printing, coating, curing and cutting zones as hereinabove disclosed in detail. The printed sheet can thus be coated with a urethane coating cured by heat, by a plastisol coating cured by heat, by the application of a vinyl clear or transulucent mottle, or chip mottle, fused to produce a solid overlay, or by the application of a vinyl film as an overlay for the continuous sheet printed on the exterior planar surface thereof. The application and curing of a photo-polymerizable coating on the printed surface of the continuous sheet as it passes from the printing zone to the cutting zone is particularly advantageous in that such wear layers are relatively easy to apply and cure in a manner entirely compatible with the ordinary requirements of conventional high-speed tile producing operations. The invention thus represents an advance in the floor tile art of major significance, providing an economically and technically feasible process for the production of attractive, durable and dimensionally stable printed floor tile products having unlimited design and coloration potential.

Therefore, I claim;

1. A process for producing an improved vinyl asbestos or asphalt floor tile product comprising:

a. calendering a uniform mix of vinyl asbestos or asphalt floor tile ingredients to form a continuous sheet discharged from the calendering zone at a temperature of from about 110°F to about 180°F and at a travel rate of from about 80 ft./min. to about 200 ft./min.

b. printing a predetermined image on the exterior planar surface of the sheet during passage of said sheet through a printing zone essentially at the indicated travel rate;

c. coating the continuous sheet having the desired image printed thereon and traveling essentially at said travel rate with a fluid coating composition containing essentially 100% active ingredients and comprising at least one organic compound having at least two photo-polymerizable ethylenically unsaturated groups per molecule, said coating having a thickness of from about 0.001 inch to about 0.005 inch and being capable of curing upon exposure to ultraviolet light to form a hard, clear layer adhering to said sheet;

d. exposing the thus-coated sheet traveling essentially at said rate immediately to ultraviolet light having wavelengths within the range of from about 2500 A to about 4000 A in a non-oxidizing atmosphere at a temperature of from about 110°F to about 220°F, the radiation intensity level being sufficient to initiate the desired curing of the coating within an ultraviolet exposure time of from about 0.2 sec. to about 15 sec.; and e. passing the thus-treated sheet traveling essentially at said rate to a cutting zone and therein cutting the thus printed, coated and treated sheet at a temperature of not less than about 120°F to form individual printed tiles having a clear wear layer thereon, the abrasion and scratch resistance properties of said coated tile both being significantly enhanced over said properties of the untreated base tile, the dimensional stability characteristics and resistance to curling of said coated tile being comparable to those of the untreated base tile, whereby the printed tile is produced with enhanced wear properties obviating the need for frequent waxing and protecting the printed exterior planar surface of the tile.

2. The process of claim 1 in which the mix subject to calendering comprises asbestos fiber, fillers, vinyl chloride copolymer, plasticizer, pigment and a conventional amount of light and heat stabilizers, the printed tile produced thus comprising printed vinyl asbestos floor tile.

3. The process of claim 2 in which said coating is applied to the sheet with a thickness of about 0.003 inch.

4. The process of claim 3 in which said continuous sheet discharged from the calendering zone and thereafter printed, coated and irradiation-treated travels at from about 125 to about 175 ft./min.

5. The process of claim 2 in which the temperature at which the coated sheet is exposed to ultraviolet radiation is at least about 130°F.

6. The process of claim 2 in which said fluid coating contains a photosensitizer.

7. The process of claim 6 in which said fluid coating contains a vinyl monomer copolymerizable under ultraviolet radiation with said photo-polymerizable, multi-functional organic compound, said vinyl monomer being sufficiently stable to prevent gelation with said compound prior to exposure to said ultraviolet radiation, said monomer being present in an amount within the range of from about 15% to about 60% by weight based on the total weight of said organic compound and said monomer.

8. The process of claim 7 in which said monomer is employed in an amount within the range of from about 15% to about 45% by weight.

9. The process of claim 8 in which said monomer is employed in an amount within the range of from about 30% to about 35% by weight.

10. The process of claim 8 in which said photo-polymerizable ethylenically unsaturated groups are acrylyl groups of the structure

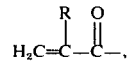

wherein R is H or $CH_3$.

11. The process of claim 10 in which the image printed on the exterior planar surface of the sheet is preformed on the surface of a printing plate for transfer to said sheet as it passes through the printing zone.

12. The process of claim 10 in which said photo-polymerizable compounds contain polar groups taken from the group consisting of urethanes, ureas, amides, esters, epoxy and combinations thereof.

13. The process of claim 12 in which said polar groups comprise urethane groups.

14. The process of claim 12 in which said polar groups comprise ester groups.

15. The process of claim 12 in which said coating is exposed to ultraviolet light at a temperature of at least about 130°F.

16. The process of claim 15 in which said ultraviolet light exposure temperature is from about 130°F to about 180°F, said sheet being cut into individual tiles at a temperature of at least about 130°F.

17. The process of claim 16 in which said exposure time is from about 0.2 sec. to about 10 sec.

18. The process of claim 15 and including embossing or valley printing said sheet prior to coating with said fluid coating composition.

19. The process of claim 1 in which the mix subjected to calendering comprises asbestos, binder materials, fillers, antioxidant and pigments, the printed tile thus produced comprising printed asphalt floor tile.

20. The process of claim 19 in which the temperature at which the coated sheet is exposed to ultraviolet radiation is at least about 130°F.

21. The process of claim 20 in which the thickness of said coating is about 0.003 inch.

22. The process of claim 19 in which said fluid coating contains a photosensitizer.

23. The process of claim 22 in which said fluid coating contains a vinyl monomer copolymerizable under ultraviolet radiation with said photo-polymerizable, multi-functional organic compound, said vinyl monomer being sufficiently stable to prevent gelation with said compound prior to exposure to said ultraviolet radiation, said monomer being present in an amount within the range of from about 15% to about 60% by weight based on the total weight of said organic compound and said monomer.

24. The process of claim 23 in which said monomer is employed in an amount within the range of from about 15% to about 45% by weight.

25. The process of claim 24 in which said photopolymerizable ethylenically unsaturated groups are acrylyl groups of the structure

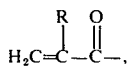

wherein R is H or $CH_3$.

26. The process of claim 25 in which the image printed on the exterior planar surface of the sheet is preformed on the surface of a printing plate for transfer to said sheet as it passes through the printing zone.

27. The process of claim 25 in which said photopolymerizable compounds contain polar groups taken from the group consisting of urethanes, ureas, amides, esters, epoxy and combinations thereof.

28. The process of claim 27 in which said polar groups comprise urethane groups.

29. The process of claim 27 in which said coating is exposed to ultraviolet light at a temperature of at least about 130°F.

30. The process of claim 29 in which said ultraviolet light exposure time is from about 0.2 sec. to about 10 sec.

31. The process of claim 30 and including embossing or valley printing said sheet prior to coating with said fluid coating composition.

32. A process for producing an improved vinyl asbestos or asphalt floor tile product comprising:

a. calendering a uniform mix of vinyl asbestos or asphalt floor tile ingredients to form a continuous sheet discharged from the calendering zone at a temperature at least about 110°F to about 180°F and at a travel rate of at least about 80 ft./min.;

b. printing predetermined image on the exterior planar surface of the sheet during passage of said sheet through a printing zone essentially at the indicated travel rate;

c. coating the continuous sheet having the desired image printed thereon and traveling essentially at said travel rate with a fluid coating composition containing essentially 100% active ingredients and comprising at least one organic compound having at least two photopolymerizable ethylenically unsaturated groups per molecule, said coating having a thickness of from about 0.001 inch to about 0.005 inch and being capable of curing upon exposure to ultraviolet light to form a hard, clear layer adhering to said sheet;

d. exposing the thus-coated sheet traveling essentially at said rate immediately to ultraviolet light having wavelengths within the range of from about 2500 A to about 4000 A in a non-oxidizing atmosphere at a temperature of from about 110°F to about 220°F, the radiation intensity level being sufficient to initiate the desired curing of the coating within an ultraviolet exposure time of from about 0.2 sec. to about 15 sec.; and e. passing the thus-treated sheet traveling essentially at said rate to a cutting zone and therein cutting the thus printed, coated and treated sheet at a temperature of not less than about 120°F to form individual printed tiles having a clear wear layer thereon, the abrasion and scratch resistance properties of said coated tile both being significantly enhanced over said properties of the untreated base tile, the dimensional stability characteristics and resistance to curling of said coated tile being comparable to those of the untreated base tile, whereby the printed tile is produced with enhanced wear properties obviating the need for frequent waxing and protecting the printed exterior planar surface of the tile.

* * * * *